(12) United States Patent (10) Patent No.: US 8,381,762 B2
Shay (45) Date of Patent: Feb. 26, 2013

(54) FLOW REGULATOR

(75) Inventor: Ofer Shay, Kfar Vradim (IL)

(73) Assignee: MFS Medical Flow Systems Ltd., Shlomi (IL)

( * ) Notice: Subject to any disclaimer, the term of this patent is extended or adjusted under 35 U.S.C. 154(b) by 583 days.

(21) Appl. No.: 12/523,321

(22) PCT Filed: Jan. 21, 2008

(86) PCT No.: PCT/IL2008/000094
§ 371 (c)(1),
(2), (4) Date: Jul. 16, 2009

(87) PCT Pub. No.: WO2008/090548
PCT Pub. Date: Jul. 31, 2008

(65) Prior Publication Data
US 2010/0089469 A1    Apr. 15, 2010

(30) Foreign Application Priority Data

Jan. 22, 2007   (IL) .......................................... 180877

(51) Int. Cl.
*F16K 35/02* (2006.01)
(52) U.S. Cl. ........................................ 137/501; 251/113
(58) Field of Classification Search .................. 137/501; 251/111, 113
See application file for complete search history.

(56) References Cited

U.S. PATENT DOCUMENTS

| 4,241,757 A | * | 12/1980 | Bron | 137/501 |
| 4,343,305 A | * | 8/1982 | Bron | 604/248 |
| 4,577,831 A | | 3/1986 | Dibartolo | |
| 4,769,012 A | * | 9/1988 | Quang et al. | 604/247 |
| D319,506 S | * | 8/1991 | Lal et al. | D24/129 |
| 5,101,854 A | * | 4/1992 | Bron | 137/501 |
| 5,421,363 A | | 6/1995 | Bron | |
| 5,520,661 A | * | 5/1996 | Lal et al. | 604/246 |
| 6,254,576 B1 | * | 7/2001 | Shekalim | 604/246 |
| 6,598,618 B1 | | 7/2003 | Shay | |
| 6,860,993 B2 | | 3/2005 | Effenhauser et al. | |
| 2005/0010077 A1 | | 1/2005 | Calderon | |

* cited by examiner

*Primary Examiner* — William McCalister
(74) *Attorney, Agent, or Firm* — Pearl Cohen Zedek Latzer, LLP (57) ABSTRACT

The invention relates to the metering of fluids at low flow rates. More particularly, the invention provides a flow regulator for flows as low as about ½ ml per hour, provided with locking means for any set value within its range. The flow regulator comprises: an inner non-revolving core element, an outer housing, having a hollow base section and being revolvably supported co-axially with the core element, first and second chambers disposed between the core element and the outer housing, each chamber having an inlet and an outlet, the outlet of the first chamber and the inlet of the second chamber being connected by a flow restriction path, a diaphragm separating the two chambers and sealing an inlet to a discharge tube when pressure in the first chamber is higher than pressure in the second chamber, and a circular spring placed in the secondary chamber below the diaphragm and around the discharge tube. The major improvement being the addition of a graduated flow rate locking ring housing a disk-like body disposed between the outlet of the discharge tube and the base portion of the outer housing.

11 Claims, 11 Drawing Sheets

FLOW REGULATOR

CROSS-REFERENCE TO RELATED APPLICATIONS

This application is a National Phase Application of PCT International Application No. PCT/IL2008/000094, International Filing Date 22-Jan-2008, claiming priority of Israel Patent Application No., 180877, filed 22-Jan-2007, which is hereby incorporated by reference in its entirety.

BACKGROUND AND FIELD OF INVENTION

The present invention relates to the metering of fluids at low flow rates.

More particularly, the invention provides a flow regulator for flows as low as about ½ ml per hour, now provided with locking means for any set value within its range.

The present invention is a development of, and an improvement on our previous patent U.S. Pat. No. 6,598,618 B1, which is hereby incorporated herein by reference.

Although the flow regulator made according to our previous patent '618 has been used successfully, there has been some user feedback which demanded thorough consideration. The lack of a locking means is thought to have prevented patients from going home while still needing medication, as the doctor in charge could not be assured that the patient would be receiving the required dosage, not more and not less. The resulting longer stay in hospital is detrimental to the patient and expensive for those paying for health care. Even while the patient is still hospitalized there are cases of a medicine being infused into a patient wherein an increased dosage would endanger the life thereof. In such cases the medical team is understandably averse to assuming that nobody will tamper with the flowmeter. Also, some users reported difficulty in turning the outer hollow housing, in order to adjust the flow rate, while at the same time restraining revolution of the core member.

These concerns are the major factors which are addressed by the present application.

A search for prior art regarding the period since our '618 patent was published revealed little new in the field of low-flow regulators.

About half a year before the publication of our '618 patent, a US patent application to Effenhauser et al, US2002/0087110A1 was published. This application discloses an evaporation type pump for exceedingly low-flow tasks in the range of 1 to 1000 nl/min. Larger flows which are often needed for liquid infusions are of course not possible with this type of pump.

Calderon in US Patent Application No. 2005/0010077 discloses a "Low-flow atrial-arterial shunt for pump-assisted myocardial revascularization without cardiopulmonary bypass." The blood-containing tube disclosed is to be placed in a peristaltic pump, thus making the device unsuitable for monitoring very low flows and unlike the regulator of the present application.

OBJECTS TO THE INVENTION

It is therefore one of the objects of the present invention to obviate the disadvantages of prior art regulators and to provide such a unit can which can be permanently locked at a selected setting.

It is a further object of the present invention to provide such a unit can which can be locked at a selected setting, but can also be unlocked if necessary.

Yet a further object is significantly improving ease of use by providing suitable grip surfaces on components which are gripped by hand.

SUMMARY OF THE INVENTION

The present invention achieves the above objects by providing, in a flow regulator for a wide range of low fluid flows, comprising:
an inner non-revolving core element;
an outer housing, having a hollow base section and being revolvably supported co-axially with said core element;
first and second chambers disposed between said core element and said outer housing, each chamber having an inlet and an outlet, said outlet of said first chamber and said inlet of said second chamber being connected by a flow restriction path;
an at least partly elastic diaphragm separating the two chambers and sealing an inlet to a discharge tube when pressure in said first chamber is higher than pressure in said second chamber, said diaphragm comprising an outer ring, a central disk, and a flexible intermediate section connecting said outer ring to said central disk; and
a circular spring placed in the secondary chamber below said diaphragm and around the discharge tube; and
said discharge tube having said inlet connected to said outlet of said second chamber when said central disk is spaced apart from said inlet, and having a lower outlet connectable for infusion to a patient;
the major improvement being the addition of a graduated flow rate locking ring housing a disk-like body disposed between the outlet of said discharge tube and said base portion of said outer housing, and a locking sleeve disposed between said disk and said ring, wherein when said locking sleeve is in it open position and said ring is in its open position a lock key is in a low position freeing said outer housing to be revolved to any position within its range including a priming position, while said ring can be revolved to select any flow-rate within the regulator's range;
whereas when said ring is in its upper position said lock key is raised to its upper position and said outer sleeve is restricted to the regulating and closed positions and said ring is secured at the selected flow rate, as long as said locking sleeve is in it open position said ring can be moved to its low position to reselect any flow-rate within the regulator's range and set again to its upper secured position, said locking sleeve can be moved to its locked position only when said ring is in its upper position, once said locking sleeve moved to its locked position said ring is permanently locked at the selected flow rate.

It should be noted that the term "pressure" may include the combined pressure of the liquid therein and the force of the spring.

An axial-direction detent is actuated during such movement preventing subsequent removal of said ring and thus permanently restricting said outer sleeve to the regulating and closed positions.

In a further preferred embodiment of the present invention there is provided a flow regulator wherein said ring is provided with at least one short internal slot, the slot length being disposed parallel to an end face of said ring, said internal slot being engaged by at least one corresponding projection extending outwardly from said inner non-revolving core element.

In a further preferred embodiment of the present invention there is provided a flow regulator wherein a long internal slot is disposed with its length parallel to an end face of said locking ring corresponding to a projection extending outwardly from a disk-like body disposed inside said locking ring.

In a further preferred embodiment of the present invention there is provided a flow regulator wherein said flow restriction path is a labyrinth path.

In yet a further preferred embodiment of the present invention there is provided a flow regulator wherein said flow restriction path is a capillary restrictor.

In another preferred embodiment of the present invention there is provided a flow regulator wherein said locking ring is provided with spaced-apart outer ribs.

In another preferred embodiment of the present invention there is provided flow regulator wherein said inner non-revolving core element is provided at its lowest open face with at least two spaced-apart finger grips.

In a most preferred embodiment of the present invention there is provided a flow regulator wherein said outer revolvable housing is provided with a plurality of spaced-apart outer ribs.

In a most preferred embodiment of the present invention there is provided a flow regulator configured for disposable use.

It will thus be realized that the novel regulator of the present invention serves to facilitate the continuous administration of IV or subcutaneous infusion for purposes such as continuous post-operative pain therapy and also in continuous oncology treatment and continuous antibiotic treatment. For improved therapy, the physician needs the option to re-set the regulator flow-rate through the course of hospitalization to best match between the administration variants to the patient needs and to securely lock the desire flow rate prior releasing the patient home with the administration for continuation of the therapy.

When at the PRIMING setting the regulator allows free flow, which is helpful during initial set up. Such flow could however be disastrous for a patient, and an important feature of the regulator is that the PRIMING position can be locked out, permanently if required.

During testing and setting of the regulator it is occasionally helpful to check the pressure inside the second chamber. An access port to the second chamber is provided for this purpose, which can be accessed by a pressure measuring gauge.

In an effort to improve the ergonomic functioning of the regulator, ribs and other grip elements have now been added to those parts which need to be gripped by the user.

The basic regulating mechanism remains the same, as described in U.S. Pat. No. 6,598,618, wherefore the components referring thereto will not again be described in detail. However for the convenience of readers the numbers used to designate those parts which are identical in both documents the numbers designated are as seen in our previous patent.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings.

FULL DISCLOSURE OF THE INVENTION

Figure 1:
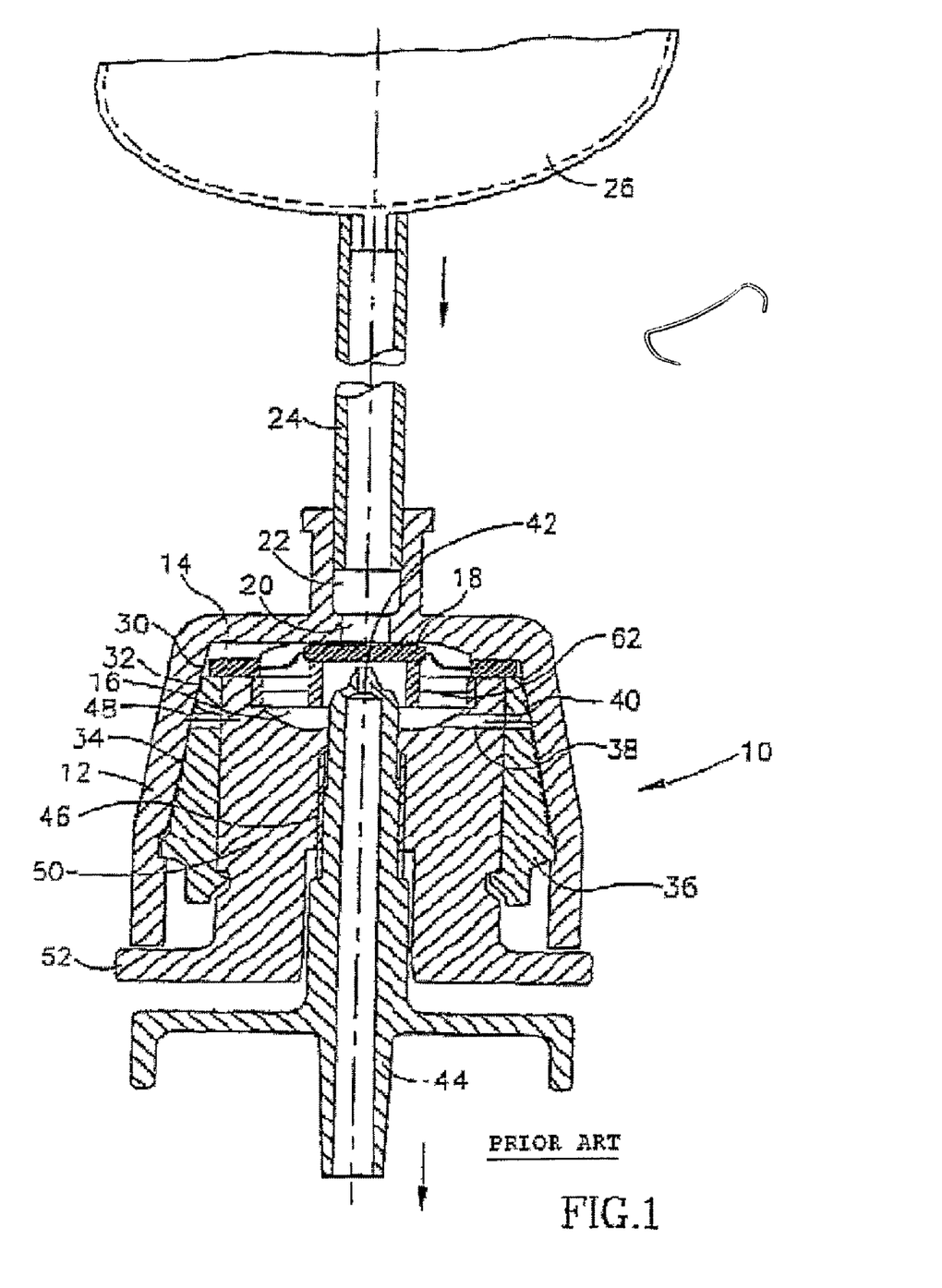
FIG. 1 is a sectioned elevational view of our prior-art regulator as seen in U.S. Pat. No. 6,598,618.
Figure 2A:
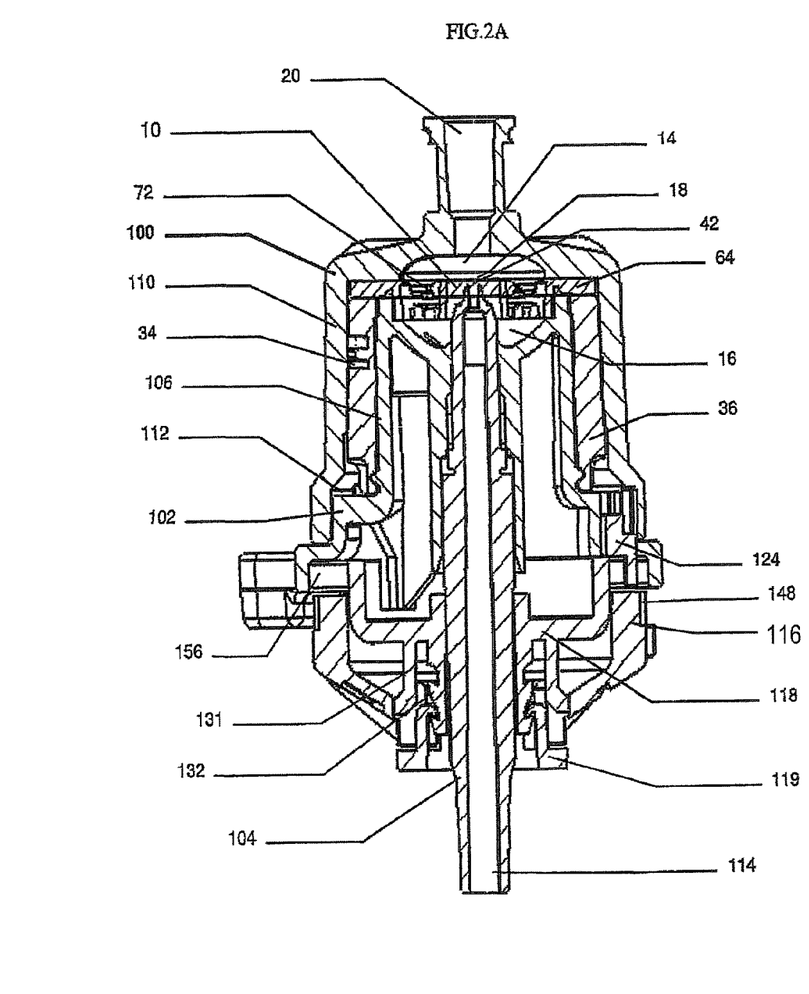
FIGS. 2a 2b and 2c are partially sectioned elevational views of a preferred embodiment of the regulator according to the present invention.
Figure 2B:
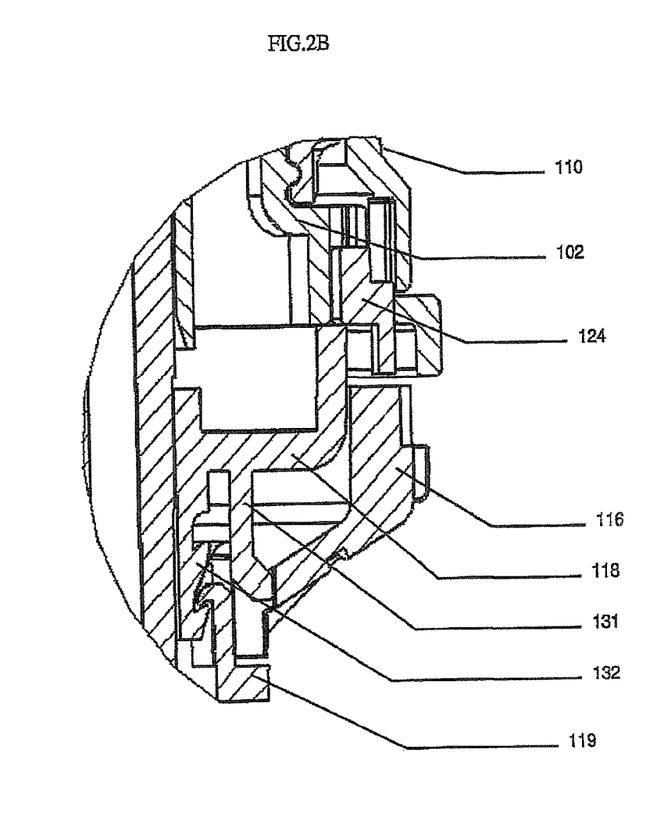

For ease of reference there is shown in FIG. 1 a general view of our prior art regulator and a brief description is offered with reference to FIGS. 2a and b, which further describes improvements now disclosed.

Figure 2C:
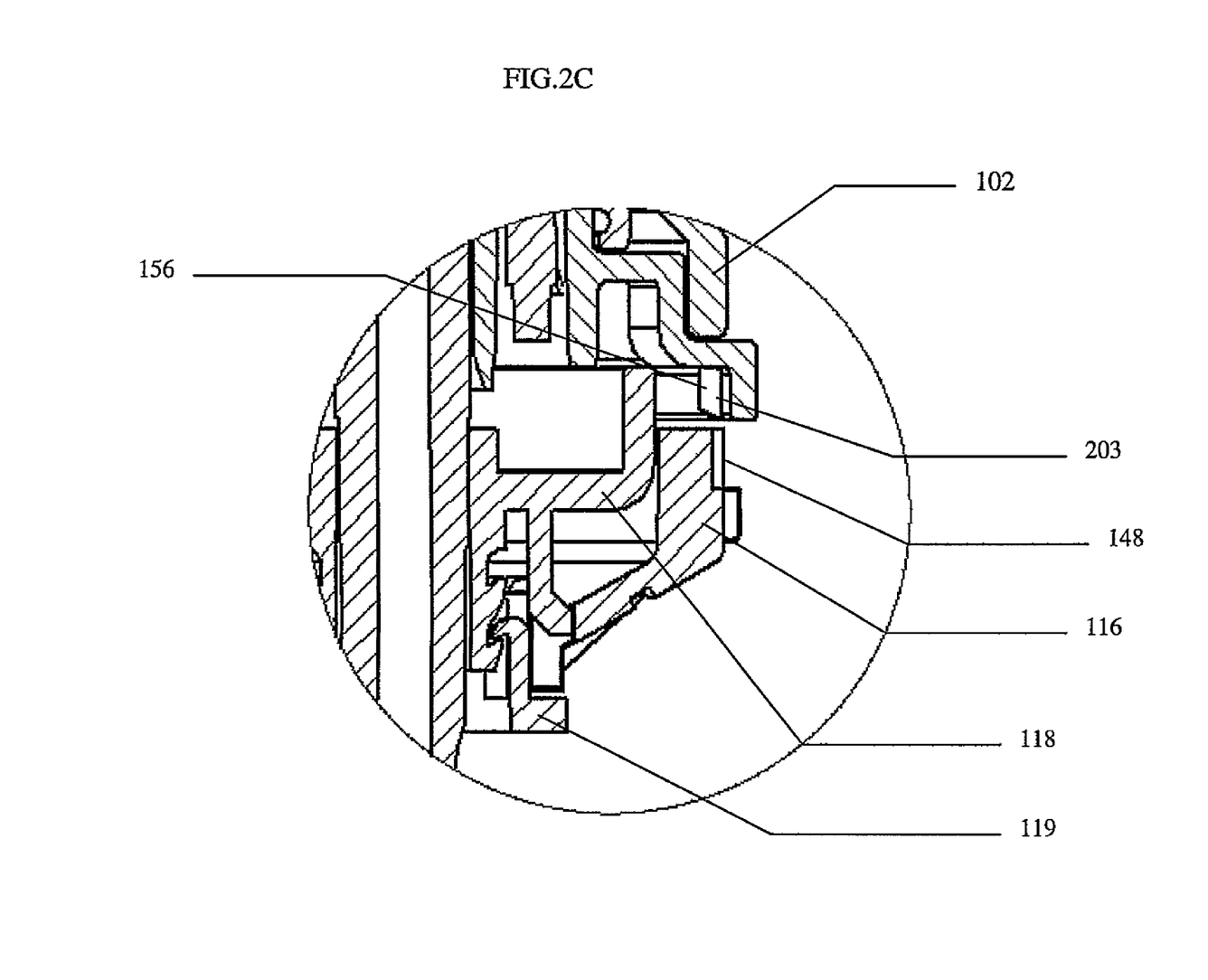

Referring now to FIGS. 2a b and c, there is seen a flow regulator 100 for a wide range of low fluid flows. An inner non-revolving core element 102 is composed of a central tube 104, a main body 106 and a sleeve element 36 attached to the main body 106. The sleeve body 36 carries the labyrinth path 34, which can selectively be short circuited in part or in whole by revolving the outer housing 110.

The outer housing 110 has a hollow base section 112 and is revolvably supported co-axially with the core element 102.

The first chamber 14 has an inlet at 20 and an outlet (not seen) leading to the labyrinth path 34. The second chamber 16 has an inlet (not seen) and an outlet 42. The outlet of the first chamber 14 is connected to the inlet of the second chamber 16, the connection being by all or part of the labyrinth path 34.

An elastic diaphragm 18 separates the two chambers 14, 16 and also seals alternately the inlet to the central discharge tube 104 being the outlet 42 of the second chamber 16. Diaphragm movement is a function of the pressure differential between the first and second chambers 14, 16.

The diaphragm 18 comprises an outer ring 64, a central disk 66, and a flexible intermediate section 72 connecting the outer ring 64 to the central disk 66. Due to the flexibility of the intermediate section 72 of the diaphragm 18 a small pressure differential applied thereto can move the central portion 66 of the diaphragm up or down.

The discharge tube inlet, which has been referred to as the second chamber outlet 42, when open, receives fluid therefrom. A lower outlet 114 of the discharge tube 104 is connectable for infusion to a patient.

Nearly all parts of the regulator 100 are constructed of plastic components, and configured for disposable use. These features have been described in our previous patent.

Disk like body 118 is fixedly connected to discharge tube 104. The ring 116 is assembled over disk like body 118 and can be moved axially however revolvably locked by a pair of projection teeth 120 (not seen) which can slide in guide channels 122 (not seen) within ring 116. Thus, circular movement of locking ring 116 will cause circular movement of discharge tube 104 and consequently will vary the distance between diaphragm central ring 66 and outlet 42 of discharge tube 104 for fine-tuning of the regulator flow rate.

Figure 3A:
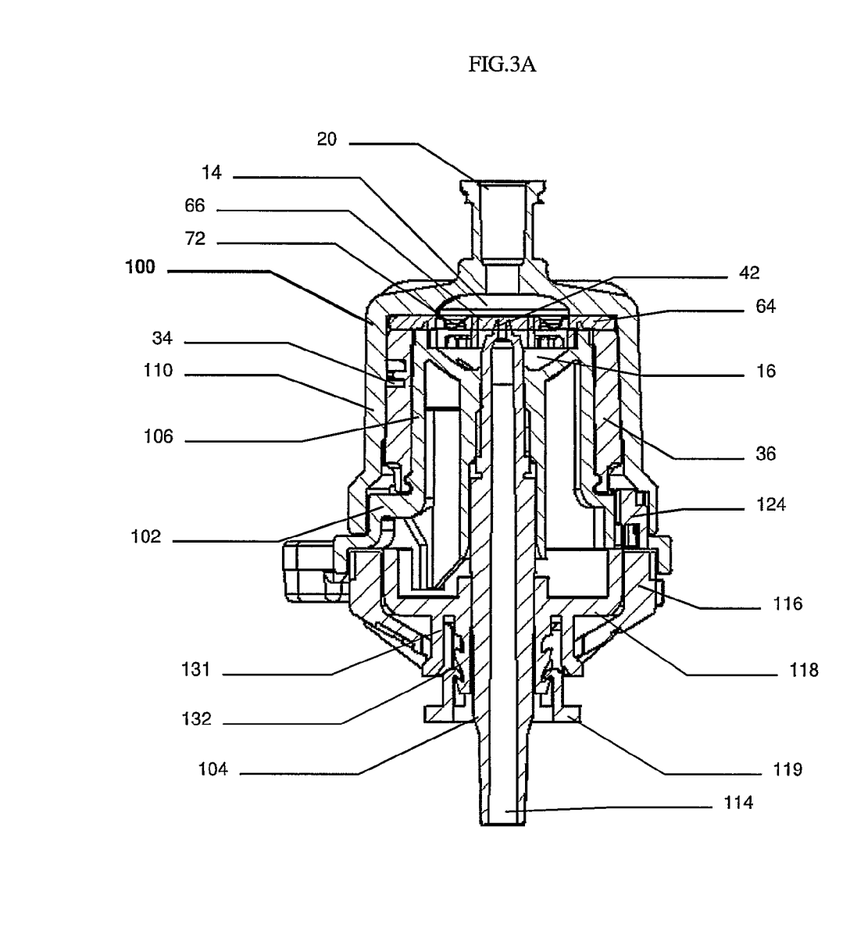
FIGS. 3a and 3b are partially sectioned detail views of the same embodiment after the ring has been pressed upwards into the open bottom flange of the core body.
Figure 10:
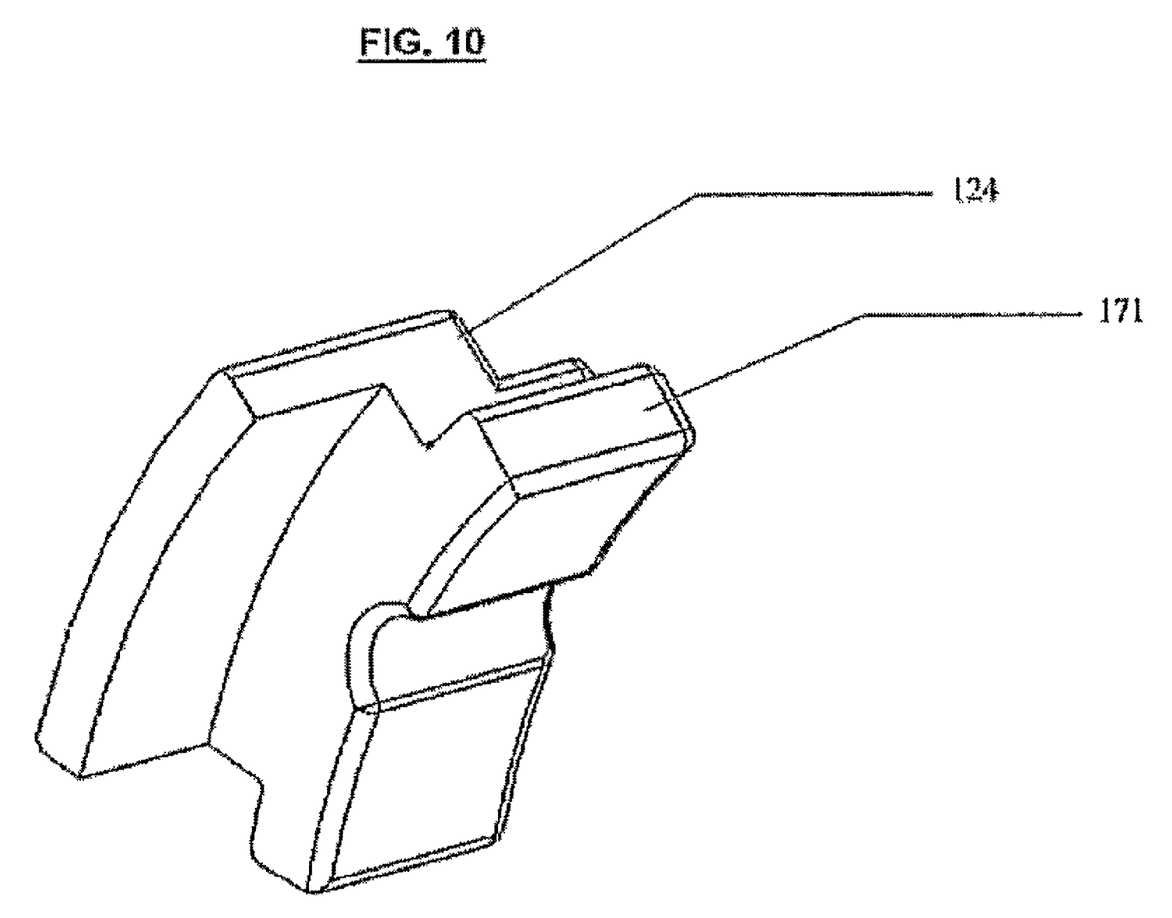
FIG. 10 is a perspective view of the lock key.

When the ring 116 is in its open (lower) position, as seen in the present figure, a lock key 124, to be described in FIG. 10, is in a low position freeing the outer housing 110 to be revolved to any position within its range including a priming position. Once the ring 116 is in its upper position (locked/secured), as shown in FIGS. 3a and b, the lock key 124 is also raised to its upper position and the outer housing 110 is restricted to the regulating and closed positions.

Locking sleeve 119 is at its lower position held by lower teeth 132 of disk 118. Disk like member 136 of locking sleeve 119 set the lower location of ring 116. Projection 135 of said locking sleeve situated inside dent 138 of said ring and eliminates relative circular movement. When ring 116 situated at its lower position, both legs like members 131 of disk 118 can't bend and avoiding accidentally movement (upward) of locking sleeve to its locked position.

Serrated section 148 of locking ring 116 engage with projections 203 provided in open face 156 and lock said locking ring of circular movement. Thus the distance between said diaphragm and said discharge tube is locked and the flow rate cannot be varied.

With reference to the rest of the figures, similar reference numerals have been used to identify similar parts.

Figure 3B:
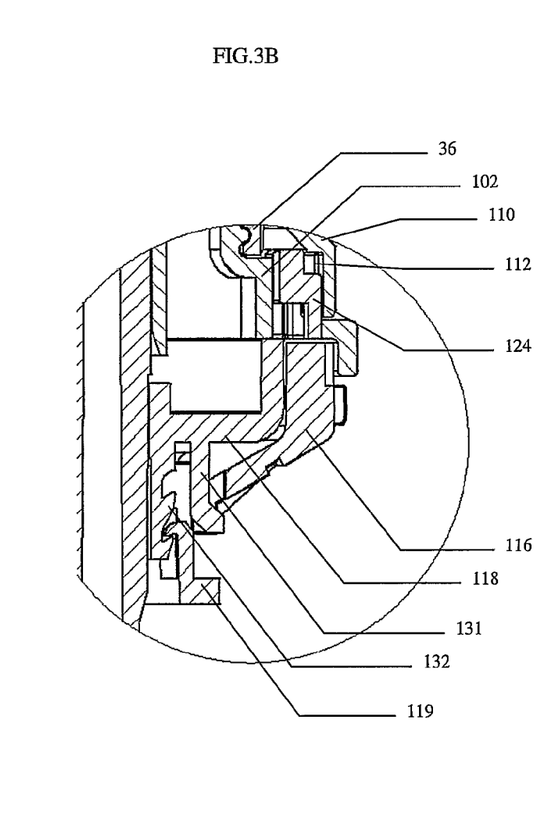

FIGS. 3a and 3b illustrate the same embodiment of the flow regulator of FIG. 2, except that the ring 116 is shown in its secured (upper) position. In this configuration the ring 116 secured remains in fixed axial relationship to the disk-like body 118. The flow regulator 100 is secured by pressing the ring 116 axially upwards into the circular hallow 156 of main body 106 and engaged with projections 203 (not seen) that lock them from circular movement, lock key 124 eliminates to set the regulator to priming position, thus flow regulator 100 is locked off being in priming position and the flow rate is secured. The ring 116 is in direct contact with the lock key 124 which is raised thereby to restrict rotation of the outer revolvable housing 110 to the regulating and closed positions.

Figure 4A:
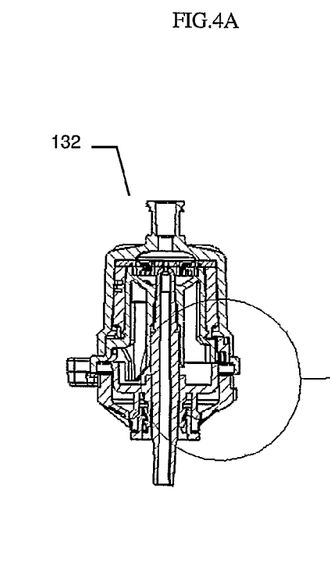
FIGS. 4a, 4b, 4c and 4d are partially sectioned detail views of the same embodiment after the locking sleeve been pressed upwards following placing the ring in secured position (all variants are permanently locked)
Figure 4B:
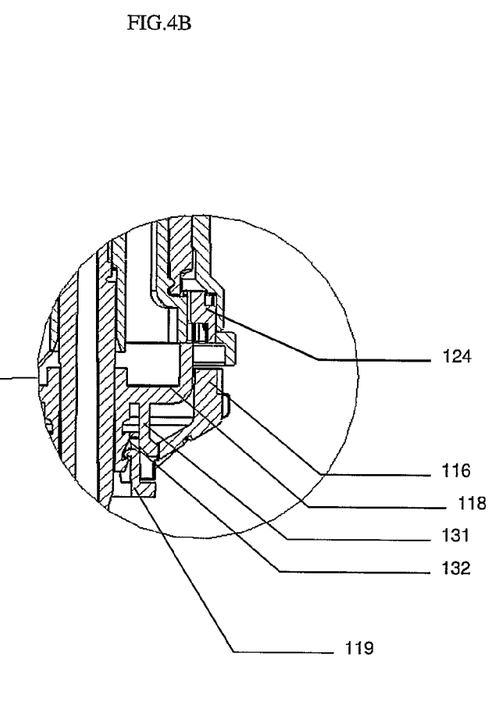
Figure 4C:
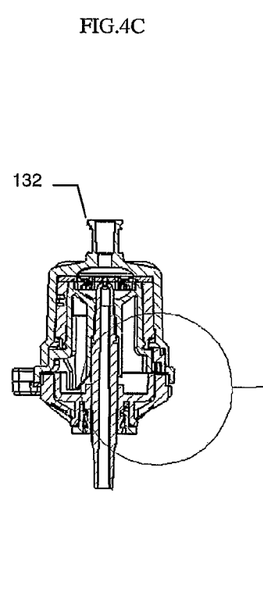
Figure 4D:
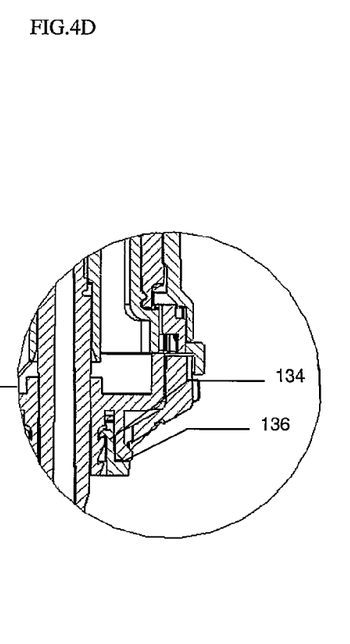

FIGS, 4a, 4b, 4c, and 4d illustrate the same embodiment of the flow regulator of FIG. 3; in FIGS. 4a and 4b ring 116 is free at its lower position to reselect flow rate, lower circular face of said ring touches flange 136 of locking sleeve 119, in FIGS. 4c and 4d ring 116 is locked at its upper position at the selected flow rate; positioned in the circular hallow 156 of main body 106 engaged with projections 203 (not seen) that permanently lock it from circular movement, flange 136 of locking sleeve 119 eliminates axially movement of said ring; teeth 134 of said locking sleeve are locked on the upper teeth 132 of disk member118. Thus the flow regulator 100 is locked by pressing the locking sleeve 119 axially upwards.

Figure 5:
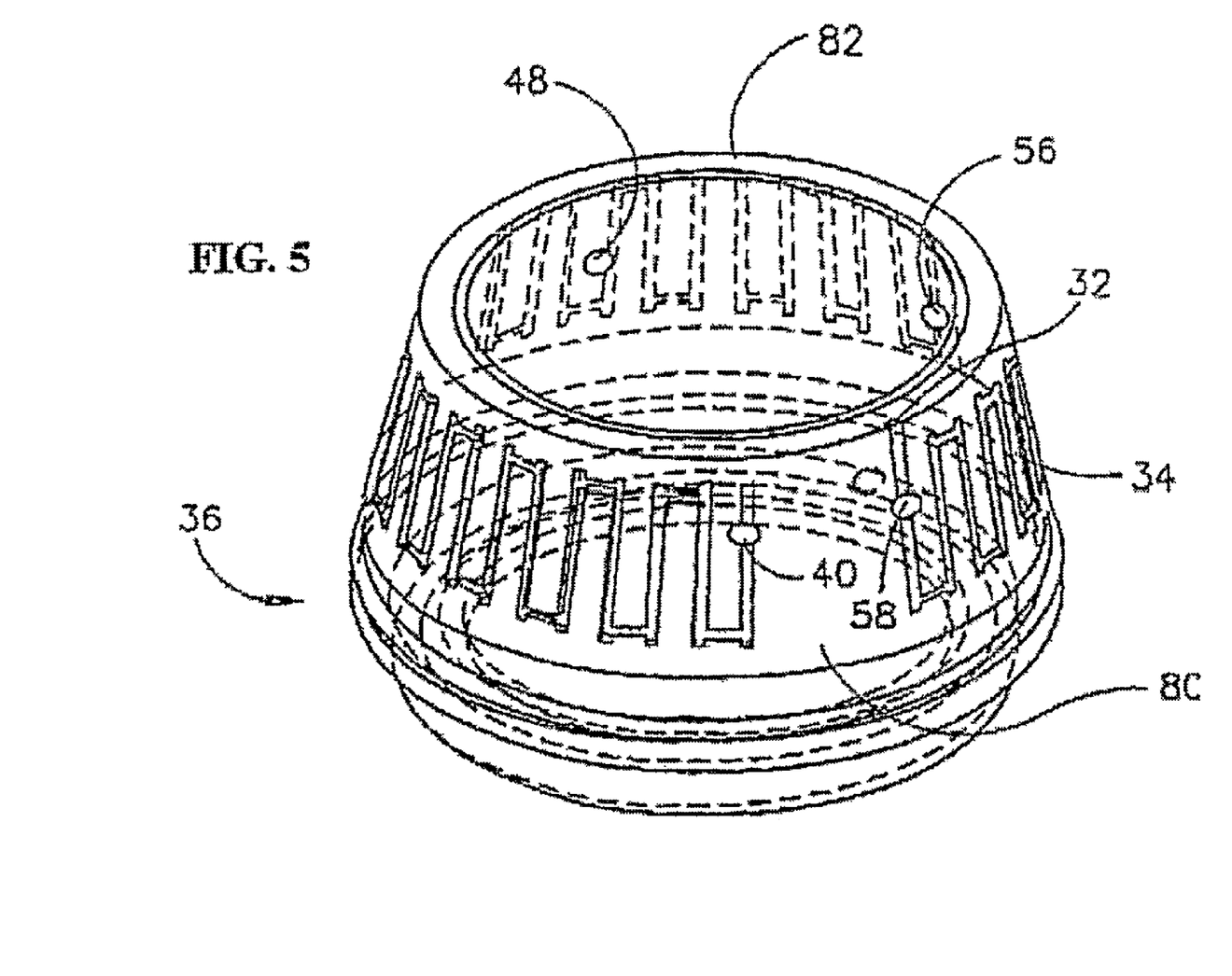
FIG. 5 is a perspective view of the labyrinth cone 36 of the flow regulator.

Referring now to FIG. 5, there is depicted the labyrinth cone 36 of the flow regulator 100 described with reference to FIGS. 2a and b. This component 36 has already been described in our previous patent is presented here for reference only. The flow restriction (labyrinth) path 34 is clearly seen.

The first chamber 14 has an inlet at 20 and an outlet (not seen) leading to the labyrinth path 34. The second chamber 16 has an inlet (not seen) and an outlet at 42. The outlet of the first chamber 14 is connected to the inlet of the second chamber 16, the connection being by all or part of the labyrinth path 34.

Figure 6:
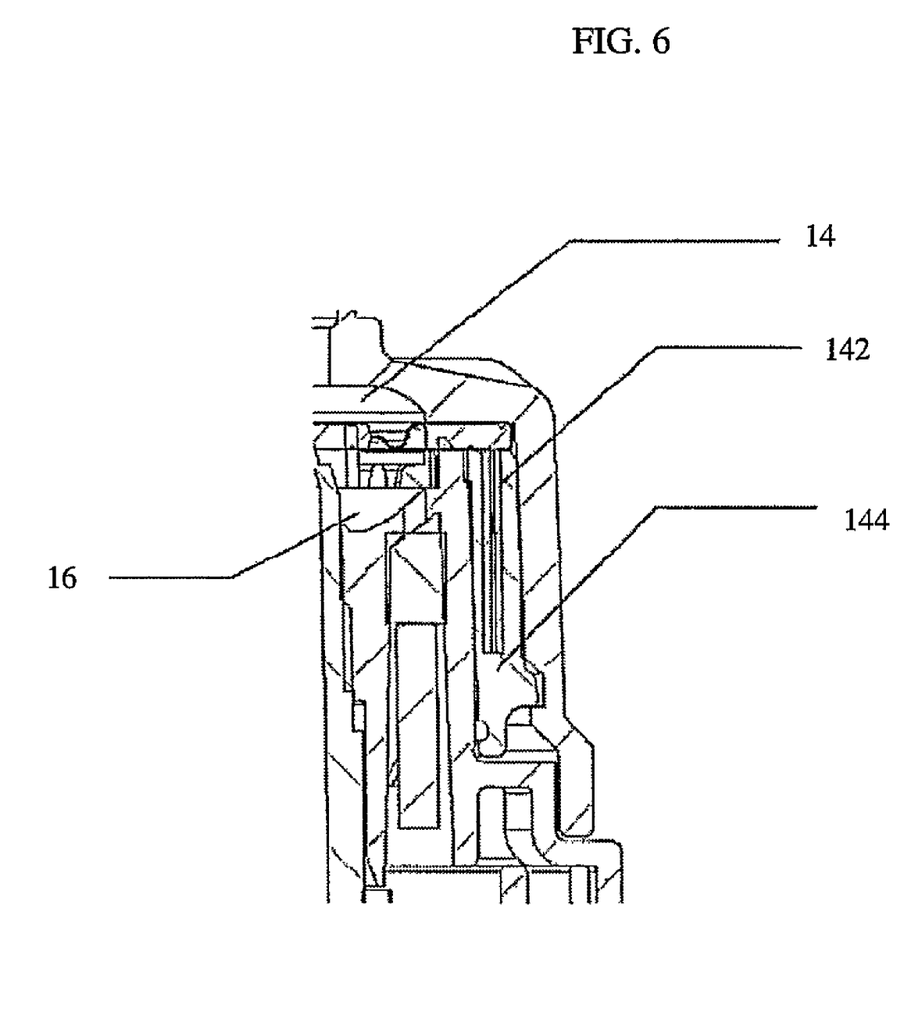
FIG. 6 is a sectioned detail view of a flow regulator of the capillary type.

FIG. 6 shows a flow regulator wherein the flow restriction is of a capillary tube 142 positioned in conical sleeve 144. In this embodiment no labyrinth is needed. The flow goes from the first chamber 14 through an outlet (not seen) leading to a capillary tube 142 and through an inlet (not seen) to secondary chamber 16. Means are provided to create a "short cut" over said capillary tube to place the regulator in Priming position.

Figure 7:
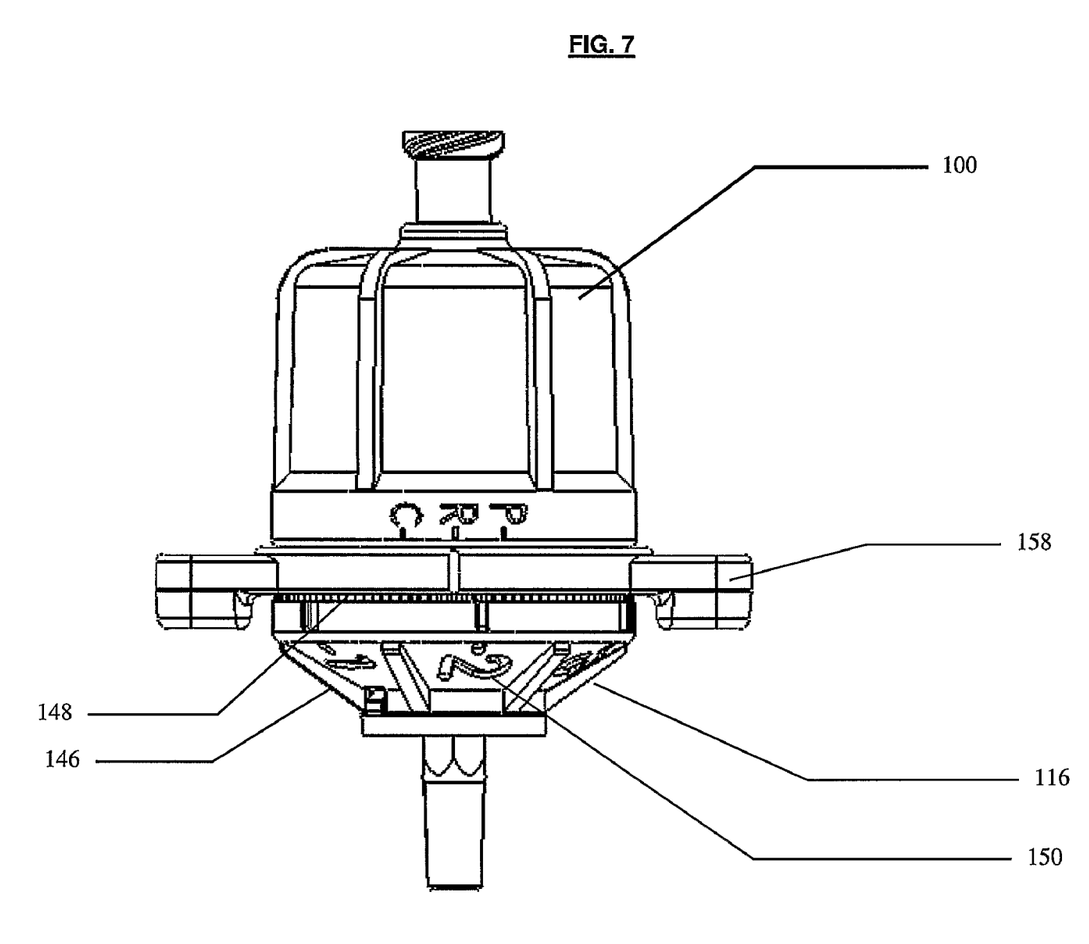
FIG. 7 is an elevational view of an embodiment provided with finger grip protrusions.

FIG. 7 illustrates a detail of the flow regulator 100 wherein the ring 116 is provided with spaced-apart outer ribs 146. Also seen in the drawing is a serrated section 148 of the ring 116 which locks the ring of circular turning when engaged with projections 203 (not seen) while positioned upwards.

The graduation marks 150 seen facilitate repeating a previous setting if needed.

The numbers represent flow rate in ml per hour in accordance to the calibration procedure. It should be noticed that actual flow rate may vary when used with solutions of deferent viscosity and/or at deferent solution temperature. The inner non-revolving core element 102 is provided at its lowest open face with two spaced-apart finger grips 158.

Figure 8:
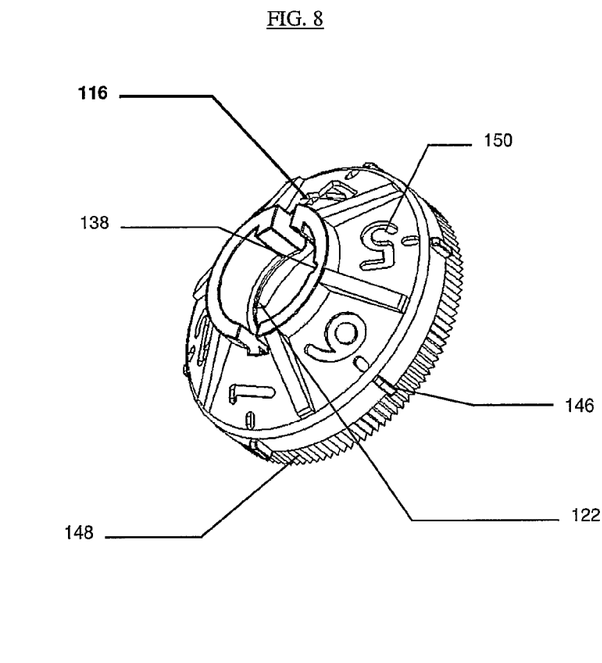
FIG. 8 is a perspective view of the ring.

FIG. 8 shows ring 116 with guide channels 122, and serrated section 148, and space-apart outer ribs 146, and graduation marks 150 and dent 138.

Figure 9A:
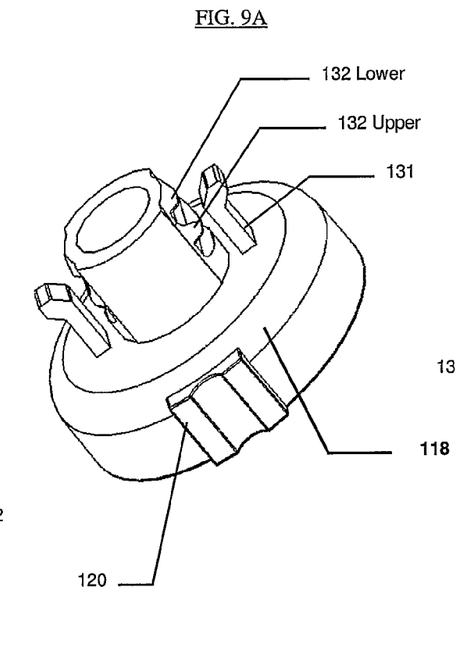
FIGS. 9a and b are a perspective view of the disk-like body and is a perspective view of the locking sleeve
Figure 9B:
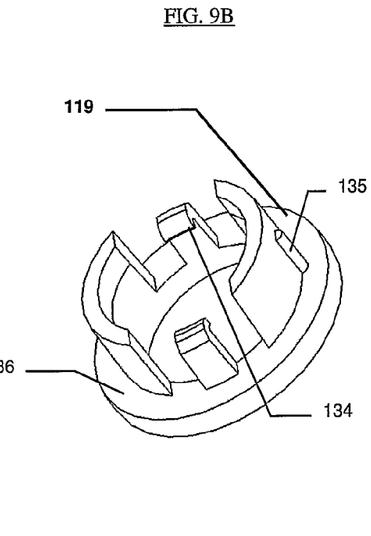

FIGS. 9a and b show disk-like member 118 with projection teeth 120 upper and lower teeth 132 and legs 131, and the locking sleeve 119 with two locking teeth 134, projection 135 and flange 136.

FIG. 10 shows the form of the lock key 124, referred to in FIGS. 2a and b. The flange of the inner non-revolving core element has a loose T-shaped guide slot 170, seen in FIGS. 2a and b, allowing the lock key 124 guided by projections 171 to be moved vertically up and down in accordance with the disk-like body 110 seen in FIGS. 2a and b.

Figure 11:
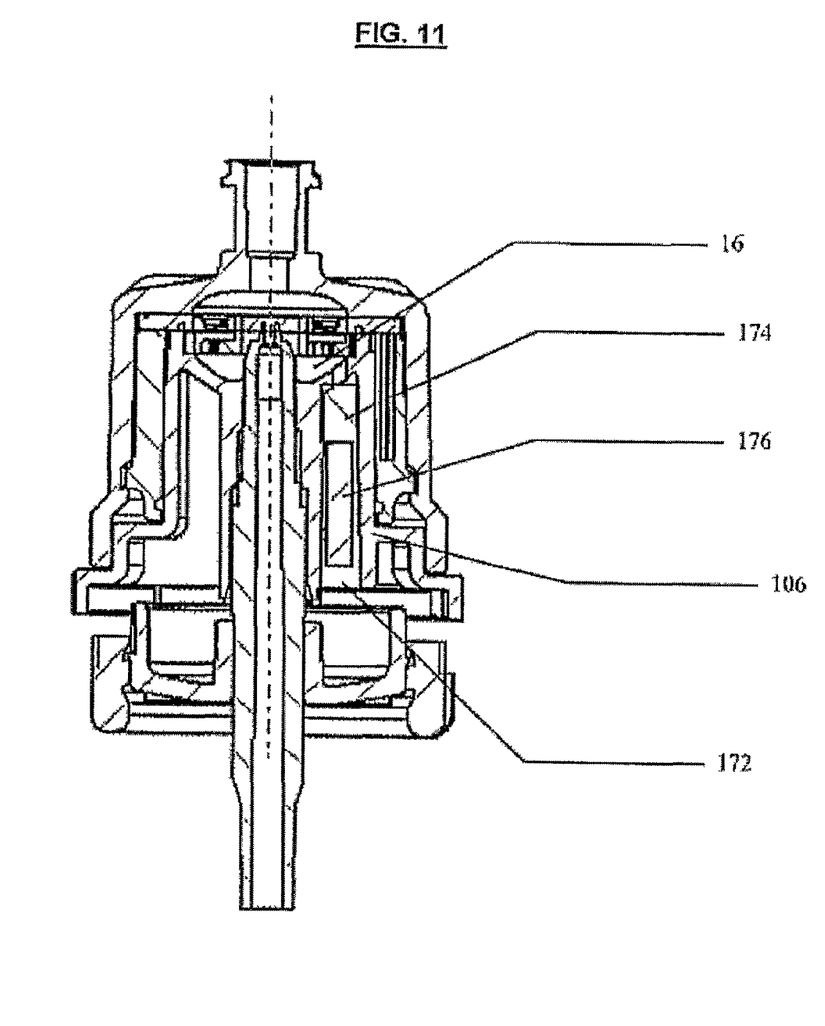
FIG. 11 is a partially sectioned detail view showing access to gauge the pressure at the secondary chamber.

Seen in FIG. 11 is the access port 172 in the core body 106 leading to the second chamber 16 for possible insertion of a sensitive pressure gauge (not shown). The access port 172 is closed by an elastomeric plug 174, which is securely held in position by a retainer cylinder 176.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

I claim:

1. A flow regulator for a wide range of low fluid flows, comprising:
   an inner non-revolving core element;
   an outer housing, having a hollow base section and being revolvably supported co-axially with said core element;
   first and second chambers disposed between said core element and said outer housing, each chamber having an inlet and an outlet, said outlet of said first chamber and said inlet of said second chamber being connected by a flow restriction path;
   an at least partly elastic diaphragm separating the two chambers and sealing an inlet to a discharge tube when pressure at said first chamber is higher than pressure in said second chamber, said diaphragm comprising an outer ring, a central disk, and a flexible intermediate section connecting said outer ring to said central disk; and
   a circular spring placed in the secondary chamber below said diaphragm and around said discharge tube; and
   said discharge tube inlet connected to said outlet of said second chamber when said central disk is spaced apart from said discharge tube inlet, and having a lower outlet connectable for infusion to a patient;
   a graduated flow-rate locking ring adapted to revolve for determining a flow rate of said regulator, said locking ring housing a disk-like body and a locking sleeve disposed between the outlet of said discharge tube and said base portion of said outer housing; and a lock key;

wherein said lock key is adapted to be in a low position or in an upper position, wherein said locking ring is adapted to be in an open position or in a secured position, wherein said locking sleeve is adapted to be in an unlocked position or a permanently locked position, wherein when said locking ring is in said open position, said lock key is in said low position, and each of said outer housing and said locking ring are free to revolve; and when said locking ring is in said secured position, said lock key is raised to said upper position and said revolving of said outer housing is permanently restricted and said locking ring is secured at a selected flow rate, wherein said locking ring is free to move from said secured position to said open position and from said open position to said secured position, when said lock key is in said upper position, and wherein said locking sleeve is adapted to permanently lock said locking ring in said secured position when said locking sleeve is in said permanently locked position to permanently lock said selected flow rate.

2. The flow regulator as claimed in claim 1, wherein said locking sleeve is provided with at least two narrow teeth, said teeth being permanently engaged by corresponding teeth extending outwardly from said disk-like body and disposed inside said locking ring through a flange of said disk-like body, whereby said locking ring permanently remains in fixed axial relationship to said disk-like body.

3. The flow regulator as claimed in claim 1, wherein said locking ring is retained in said secured position within said hollow base section of said core element by frictional contact therewith.

4. The flow regulator as claimed in claim 3, wherein a wide long internal slot is disposed with its length parallel to an end face of said locking ring, said slot being engaged by a corresponding projection extending outwardly from said disk-like body disposed inside said locking ring, said locking ring being movable axially relative to said disk-like body allowing a user to alter the flow setting when said locking ring is in said open position, and whereas two legs rising from said disk-like body are adapted to eliminate axially movement of said locking sleeve while said locking ring is in said open position.

5. The flow regulator as claimed in claim 1, wherein said flow restriction path is a labyrinth path.

6. The flow regulator as claimed in claim 1, wherein said flow restriction path is a capillary restrictor.

7. The capillary restrictor as claimed in claim 6, made of glass or plastic.

8. The flow regulator as claimed in claim 1, wherein said ring is provided with spaced-apart outer ribs.

9. The flow regulator as claimed in claim 1, wherein said inner non-revolving core element is provided at its lowest open face with at least two spaced-apart finger grips.

10. The non-revolving element as claimed in claim 9, with an access port for possible insertion of a sensitive pressure gauge.

11. The flow regulator as claimed in claim 1, wherein said outer revolvable housing is provided with at least two spaced-apart finger grips.

* * * * *